United States Patent
Tourrilhes et al.

(10) Patent No.: US 7,436,303 B2
(45) Date of Patent: Oct. 14, 2008

(54) RACK SENSOR CONTROLLER FOR ASSET TRACKING

(75) Inventors: Jean Tourrilhes, Palo Alto, CA (US); Cosme Sevestre, Palo Alto, CA (US); Cyril Brignone, Mountain View, CA (US); Tim Connors, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 11/389,784

(22) Filed: Mar. 27, 2006

(65) Prior Publication Data
US 2007/0222597 A1 Sep. 27, 2007

(51) Int. Cl.
*G08B 13/14* (2006.01)

(52) U.S. Cl. ............... 340/572.1; 340/572.4; 235/385

(58) Field of Classification Search ............ 340/572.1, 340/572.4, 5.92; 235/385; 700/215, 225; 705/22, 28
See application file for complete search history.

(56) References Cited

U.S. PATENT DOCUMENTS

| | | | | |
|---|---|---|---|---|
| 4,636,634 A | * | 1/1987 | Harper et al. | 235/385 |
| 4,814,742 A | * | 3/1989 | Morita et al. | 340/5.92 |
| 4,839,875 A | * | 6/1989 | Kuriyama et al. | 705/28 |
| 5,028,766 A | * | 7/1991 | Shah | 235/385 |
| 5,063,380 A | * | 11/1991 | Wakura | 340/825.49 |
| 5,455,409 A | * | 10/1995 | Smith et al. | 235/385 |
| 5,771,003 A | * | 6/1998 | Seymour | 340/572.1 |
| 6,335,686 B1 | * | 1/2002 | Goff et al. | 340/572.4 |
| 6,681,990 B2 | * | 1/2004 | Vogler et al. | 235/385 |
| 6,845,909 B2 | * | 1/2005 | Bong et al. | 235/385 |
| 6,901,304 B2 | * | 5/2005 | Swan et al. | 705/28 |

\* cited by examiner

*Primary Examiner*—John A Tweel, Jr.

(57) ABSTRACT

A rack sensor controller is operable to sense information for assets housed in a rack. The rack sensor controller includes a memory storing a location of the rack and sensor information received from a plurality of sensors. At least some of the sensors include one or more RFID readers operable to read RFID tags attached to assets housed in the rack. A processor is operable to receive the sensor information and generate a message including the sensor information and the location of the rack for transmission to one or more back-end applications via a forwarder. The forwarder is operable to receive the message, determine one or more back-end applications to receive the message, replicate the message for each of the back-end applications, and transmit the message to the back-end applications. The back-end applications use the location of the rack and the sensor information to track the assets.

21 Claims, 6 Drawing Sheets

200

```
<?xml version="1.0" standalone="yes"?>  ~201
<sentientMsg version="1. 6">  ~202
    <object id="e28340be-ab34-4640-b389-e0f7e7f5a969" type="rack">  ~203
        <location main_location="3U" space="1" aisle="4" number="5"/>  ~204
        <time>2005-02-04 15:17:23-0800</time>  ~205
        <capacity>42</capacity>  ~206
        [ . . .]
    </object>
</sentientMsg>
```

```
<?xml version="1.0" standalone="yes"?>
<sentientMsg version="1.6">
<object id="e28340be-ab34-4640-b389-e0f7e7f5a969" type="rack">
  <location main_location="3U" space="1" aisle="4" number="5"/>
  <time>2005-02-04 15:17:23-0800</time>
  <capacity>42</capacity>
  <data type="door" mode="event">
    <door id="0" value="closed"/>   303
  </data>                    302  304
</object>             301
</sentientMsg>
```

```
<?xml version=" 1.0" standalone="yes"?>
<sentientMsg version="1.6">
<object id="e28340be-ab34-4640-b389-e0f7e7f5a969" type="rack">
  <location main_location="3U" space="1" aisle="4" number="5"/>
  <time>2005-02-04 15:17:23-0800</time>
  <capacity>42</capacity>
  <data type="rfid" mode="event">
    <rfid u="4" value="a7cc31b64e32" serial_number="2UB4240329" event="added"/>   320
    <rfid u="24" value="456e3bc545" serial_number="2UB4240456" event="removed"/>   321
  </data>              314      313
</object>
</sentientMsg>
```

FIG. 3B

```
400
<?xml version="1.0" standalone="yes"?>
<sentientMsg version="1.6">
<object id="e28340be-ab34_4640-b389-e0f7e7f5a969" type="rack">
  <location main_location="3U" space="1" aisle="4" number="5"/>
  <time>2005-02-04 15:17:23-0800</time>
  <capacity>42</capacity>
  <data type="rfid" mode="inventory">
    <rfid u="4" value="a7cc312b64e32" serial_number="2UB4240329"/>        401
    <rfid u="7" value="71243ea65c76c" serial_number="2UB4240456"/>
  </data>
</object>
</sentientMsg>
```

FIG. 4

```
500
<?xml version="1.0" standalone="yes"?>
<sentientMsg version="1.6">
<object id="e28340be-ab34-4640-b389-e0f7e7f5a969" type="rack">
  <location main_location="3U" space="1" aisle="4" number="5"/>
  <time>2005-02-04 15:17:23-0800</time>
  <capacity>42</capacity>
  <msg type="error">Could not initialize. Hardware is not responding.</msg>    502
</sentientMsg>
                                                                               501
```

FIG. 5

RACK SENSOR CONTROLLER FOR ASSET TRACKING

BACKGROUND

Tracking computer systems and other equipment in a data center is a monumental task, especially with large data centers that may contain thousands of computer systems. Typically, tracking computer systems and equipment is performed manually. For example, a server is installed in a rack in the data center. The location of the server may be written down and then manually entered into a spreadsheet or database. This task is repeated for each server and whenever maintenance is performed that requires movement of a server. The time and expense of manually tracking the computer systems and other equipment is astronomical in large data centers. Furthermore, errors in entering location information for equipment may waste an enormous amount of time and expense when attempting to find malfunctioning equipment having improperly entered location information.

BRIEF DESCRIPTION OF THE DRAWINGS

The embodiments are illustrated by way of example and without limitation in the accompanying figures in which like numeral references refer to like elements, and wherein:

FIG. 2 shows an example of at least a portion of message that may be sent by a rack sensor controller and other components of the system shown in FIG. 1, according to an embodiment;

FIG. 3A-B show examples of event messages that may be sent by a rack sensor controller and other components of the system shown in FIG. 1, according to an embodiment;

FIG. 4 shows an example of an inventory message that may be sent by a rack sensor controller and other components of the system shown in FIG. 1, according to an embodiment;

FIG. 5 shows an example of an error message that may be sent by a rack sensor controller and other components of the system shown in FIG. 1, according to an embodiment;

DETAILED DESCRIPTION

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures are not described in detail so as not to unnecessarily obscure understanding of the examples.

1. System Overview

Figure 1:
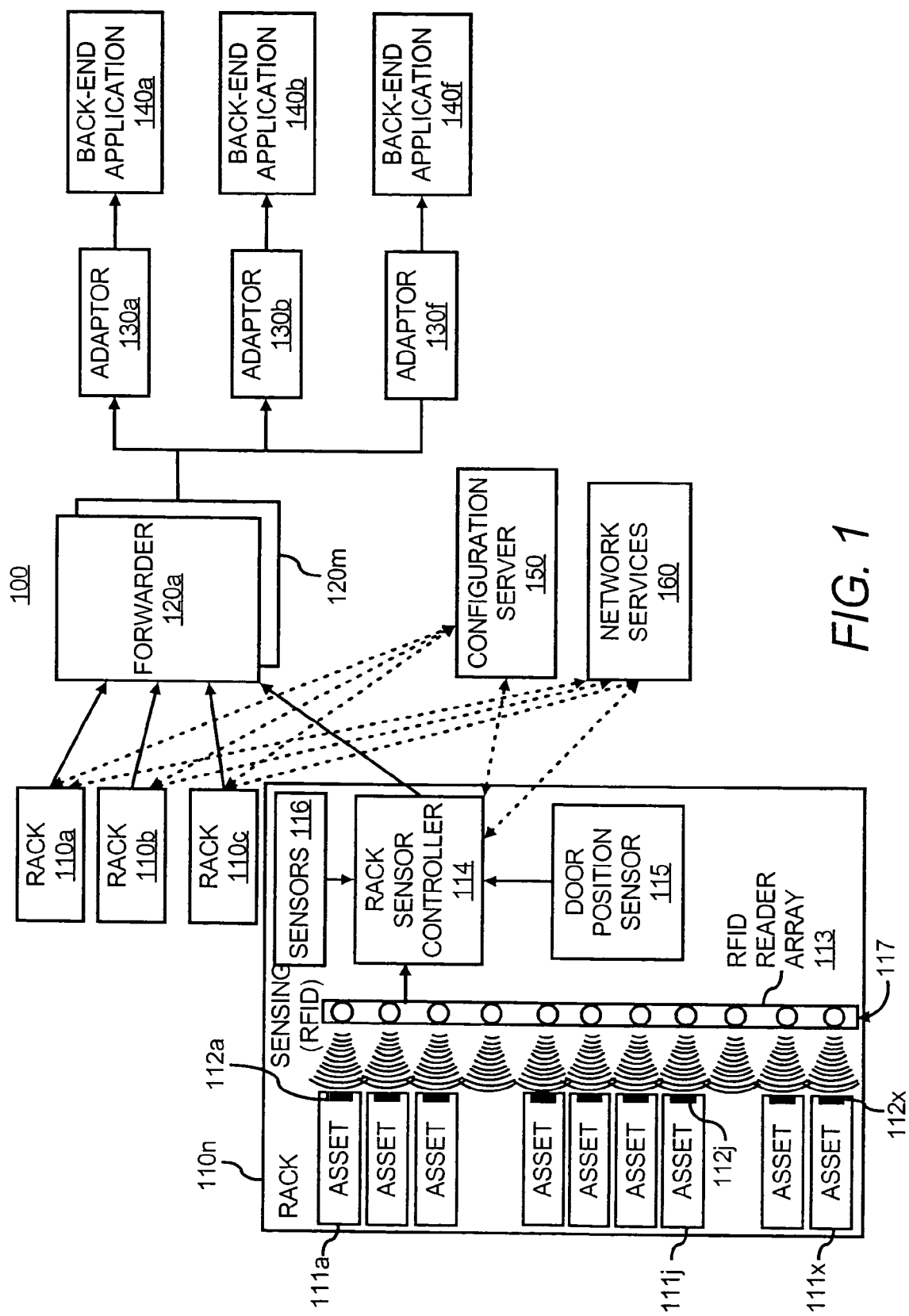
FIG. 1 shows a block diagram of a system, according to an embodiment.

FIG. 1 illustrates a system 100 according to an embodiment. The system 100 includes racks 110a-n housing assets, forwarders 120a-m, adaptors 130a-f connected to back-end applications 140a-f, a configuration server 150, and network services 160. An asset is any object that can be tracked. In an embodiment of the system 100, the assets are equipment in a data center. Examples of assets include computers, servers, switches, routers, power supplies, and storage appliances. The assets are tracked using RFID tags and readers.

The racks 110a-n house many of the assets that may be tracked using one of more of the back-end applications 140. A detailed illustration of one of the racks, 110n, is shown in FIG. 1, including assets 111a-x having RFID tags 112a-x. The assets 111a-x may be provided in each slot of the rack 110n. The racks 110a-n may include conventional server racks. Conventional racks may include 42 or more slots or a lesser number of slots, such as 22 slots, and one or more assets may be provided in each slot. The components shown for the rack 110n may be provided for each of the racks 110.

The RFID reader array 113 performs asset detection. The RFID tags 112a-x are read by the RFID reader array 113. Data from the RFID reader array 113 is transmitted to a rack sensor controller 114.

In one embodiment, the RFID reader array 113 includes a reader positioned relative to each slot in the rack 110 to read the RFID tags 112a-x for each asset 111a-x. For example, each reader energizes a corresponding RFID tag 112a-x mounted to an asset 111a-x in a slot in the rack 110n. If the RFID tag, and thus the asset, is present, the RFID tag in that slot transmits its asset ID to the RFID reader in the RFID reader array 113 and is sent to the rack sensor controller 114. In this embodiment, 117 represents a reader per slot.

In another embodiment, the RFID reader array 113 includes a reader antenna positioned relative to each slot in the rack, instead of using a reader per slot, to read the RFID tags 112a-x for each of the assets 111 a-x. Multiple antennas in the RFID reader array 113 may be connected to a single reader. A switching circuit may be used to selectively activate particular antennas to determine whether an asset is in a particular slot in the rack 110n. Each antenna may be designed to detect tags only in its corresponding slot and/or circuitry may be provided to prevent coupling of near-by antennas to facilitate reading an RFID tag in a corresponding slot. One RFID reader 113 array may be provided for multiple antennas, thus saving costs on readers. In this embodiment, 117 represents an antenna per slot. In other embodiments, an antenna is not provided per slot. Instead, a single antenna is operable to read tags for assets in multiple slots. More than one antenna may be used, but the number of antennas is less than the number of slots. Also, a single reader may be coupled to multiple antennas such that a reader per slot is not required.

In either embodiment, the RFID reader array 113 may be embedded or mounted on the rack, such as on the front door or in another location on the rack. In one example, the RFID reader array 113 is a series of one or more circuit modules. Each module includes a circuit board pairing that contains one RFID reader and a matching board containing seven RFID antennas. Each module covers a total of seven slots and hence six circuit modules can cover all the slots in an industry standard "42U" rack. Inter-module communication between the rack sensor controller 114 and the reader boards may be performed using a single shared serial port. This port daisy-chains through the reader boards and is used for autonomous module enumeration and for message passing between the modules.

In another embodiment, there is 1-s readers for 1-n slots in a rack. In this embodiment, one or more readers may be provided for a rack, but the number of readers or the number of reader antennas is not necessarily equivalent to the number of slots in a rack. There may be more or less readers or reader antennas than number of slots.

The system 100 described herein may be used for tracking assets. The system 100 may be provided in a data center. The system 100 is not limited to tracking assets in a data center. It will be apparent to one of ordinary skill in the art that system 100 may be used to track any object and can be used for applications other than data center asset tracking.

One significant feature of the system 100 is the ability to perform pinpoint asset detection. For example, each of the racks 110*a-n* is fitted with an RFID reader array that autonomously probes for assets with at least a resolution of one slot. The benefits of this design are numerous. Unlike manual and barcode methods, probing is automatic and nearly continuous. No staff intensive activity is required and data is up to date. Also, asset identification is based on the data read from the RFID tags that may each be programmed with an asset ID. No mapping is needed after reading the RFID tags to cross-reference logical names, such as hostname or addresses, with permanent asset keys or IDs. Because the asset detection mechanism is external, discovery occurs even when assets are nonfunctional, powered down or detached from the network. There is also no dependence on the production infrastructure for tracing back through network wiring. Lastly, the system 100 performs better than a sparse collection of RFID readers. Asset localization can be performed in-situ and in real-time. The pinpoint resolution of a slot in a rack means that location accuracy is as small as possible, such as down to actual asset sizes.

It will be apparent to one of ordinary skill in the art that the number of components shown in the system 100 is by way of example and not limitation. The number of components may vary based on the number of assets being tracked or other factors.

Furthermore, the system 100 is modular and highly scalable. The RFID reader arrays, rack sensor controllers, forwarders 120*a-m,* adaptors 130*a-f,* configuration server 150 and the network services 160 modularize the various functions which control the flow of location information. For example, when there are multiple back-end systems, such as the back-end applications 140*a-f,* the forwarders 120*a-m* can replicate and route information independent of either the rack hardware, such as rack sensor controller, or the back-end systems. The modular design means that the various connections can be reconfigured easily and on-the-fly.

Furthermore, installation of various components of the system 100 in an existing data center may not result in much down-time. For example, the tags 112*a-x* are simply attached to each of the assets 111*a-x,* which can be done while the assets 111*a-x* are up and running. The RFID tags 112*a-x* can then be programmed with the ID of the asset. One method may include a combination barcode reader/RFID writer which copies the serial and model numbers of the asset over to the tag. The manual tasks of tag attachment and programming are fast and may only need to be done once over the lifetime of the asset.

2. Rack Sensor Controllers

The rack sensor controllers for each of the racks 110*a-n,* which includes the rack sensor controller 114, receive sensor information acquired by the RFID reader arrays and other sensors. For example, the rack sensor controller 114 receives sensor information from the RFID reader array 113, a door position sensor 115 sensing whether a rack door has been opened or closed, and the sensors 116. Examples of the sensors 116 include but are not limited to temperature sensors, humidity and other environmental sensors, and sensors detecting whether an asset has been added or removed from a slot in a rack. Another type of sensor that may be used for the sensors 116 may include an operator ID sensor that determines the ID of an operator accessing a rack or an asset in a rack. Operator ID sensors may be used to determine whether authorized personnel are accessing an asset. The door position sensor 115 is optional.

These sensors send sensor information to the rack sensor controller 114. The sensor information may include measurements or other sensed information, sensor ID, reader ID, and possibly other information.

Location information for each of the racks 110*a-n* may be stored in the rack sensor controllers for each of the racks 110*a-n*. An example of location information for a rack in a data center may include a 4-parameter location comprising a main location, a space in the main location, an aisle in the space, and a rack number in the aisle. The space, for example, is a room or space in the main location. The number is a number identifying a rack in the corresponding aisle. This location may be manually entered or sent to the rack sensor controllers from a configuration server 150. Other parameters may be used for the location information. Many data centers use a logical description, such as the triplet of room number, aisle number and rack number.

Manual entry of the location information may be performed to minimize the possibility of storing an incorrect location in a rack sensor controller. Location information may also be transmitted from the configuration server 150 when the rack sensor controller 114 is first booted up or updated.

The location information may be contained in an ASCII string supplied by the rack sensor controller. The locations for the rack sensor controllers for the racks 110*a-n* need to be determined and stored in the rack sensor controllers. The assets are automatically located using the rack sensor controller which detects them. Each rack sensor controller knows its individual location when deployed, and is reprogrammed if moved. Since a rack can contain many assets, it can be cost effective to use an indoor positioning system, such as HP Labs Locus System [LOCUS], to create self-locating racks.

The location information may also include a slot number of a rack. For example, the asset 111*j* is detected in slot 10 of the 42-slot rack 110*n*. The slot number is stored in the rack sensor controller 114 as part of the location information along with associated sensor information.

In one example, the door position sensor 115 sends data to the rack sensor controller 114 indicating whether a door for the rack 110*n* is opened or closed. Determining whether the door is opened or closed are examples of detecting a change in state, which may include detection of a predetermined event. The rack sensor controller 114 may perform certain functions in response to detecting a predetermined event. For example the rack sensor controller 114 performs an RFID scan when the door closes and also on a periodic basis. The RFID scan includes reading RFID tags 112*a-x* in the slots in the rack 110*n* using the RFID reader array 113. The rack sensor controller 114 sends the sensor information and location information to one or more of the back-end applications 140*a-f* via components, such as the forwarders 120*a-m* and the adaptors 130*a-f.* For example, the rack sensor controller 114 formats the sensor and location information into a message, e.g., an SDC message which may use XML on HTTP, and sends the message over a network to, for example, the forwarder 120*a*. Sensor information for the sensors 116 may also be sent to the forwarder 120*a* in a message. Also, rack sensor controllers may be programmed to perform RFID scans or perform other functions in response to detecting an event other than the opening or closing of a rack door. For example, some of the racks 110*a-n* may not include doors. A sensor may be included on these racks that detects when an asset is pulled out of a slot or pushed into a slot. RFID scans may be performed upon detecting one of these events. A periodic RFID scan on no-door racks may be performed to generate both event or state messages, if a change is detected, and inventory messages, on a periodic basis.

The rack sensor controllers of the racks 110*a-n* may be assigned to one or more of the forwarders 120*a-m* for sending messages to one or more of the back-end applications 140*a-f*. The forwarders 120*a-m* are described in further detail below.

The rack sensor controllers for the racks 110*a-n* may generate state or stateless messages. A state message may be generated when a change in state of a rack is determined and sending the change in state to a back-end application in the state message. For example, the rack sensor controller 114 performs an RFID scan, which may be a periodic RFID scan or an RFID scan performed in response to the rack door being closed or temperature exceeding a threshold. The rack sensor controller 114 determines that asset 111*j* has been added to slot 10. The rack sensor controller 114 sends a state message to the back-end application 140*a* indicating the asset 111 has been added to slot 10 for rack 110*n* and tag data read from the RFID tag 112*j*. The rack sensor controller 114 may generate a state message in response to detection of a predetermined event, such as a rack door closing or temperature exceeding a threshold. The state message includes changes in the state of the rack, such as an asset is added or removed or a reading error occurred or temperature exceeds a threshold, etc. The state message may be generated and transmitted in response to detecting a change in state. The state message is transmitted to a back-end application also keeping track of the state of the rack. For example, the state includes the asset 111*j* has been added to the rack since the last message or last inventory. The back-end application 140*a* receives the update state of the asset 111*j* and changes the state of the rack 110*n* stored at the back-end application 140*a* to include the newly added asset 111*j*.

A stateless message may include the entire state of a rack, which can be sent to a back-end application. For example, the rack sensor controller 114 receives tag data from all the assets 111*a-x* in the rack 110*n* from the RFID reader array 113 and generates a message including all the tag data. For example, an inventory message is a message including the current state of all the assets in a rack that are being tracked. The rack sensor controller 114 sends the inventory message to, for example, the back-end application 140*a*. Stateless messages may be generated periodically. For example, an RFID scan of the assets 111*a-x* in the rack 110*n* is performed every hour and an inventory message is generated and transmitted to the back-end application 140*a*. In one embodiment, RFID scans are performed more often than the transmission of inventory messages, which includes data from the RFID scans.

3. Forwarders

The forwarders 120*a-m* connect the rack sensor controllers for the racks 110*a-n* to back-end systems, which include the back-end applications 140*a-f*. The forwarders 120*a-m* receive messages from the rack sensor controllers of the racks 110*a-n*, which may include sensor information and location information, and send the messages to one or more back-end systems which may be specified in a list of destinations. The forwarders 120*a-m* may replicate messages if they are intended for multiple destinations. For example, a message received from the rack sensor controller 114 may be associated with a list of destinations for back-end systems comprising a list of URLs. The forwarder 120*m* starts a sub-process for each destination URL. Each sub-process relays, in parallel, the message to its corresponding URL. This design yields low latency, efficient use of the forwarder host, and minimizes network connection times. Furthermore, it allows the back-end applications 140*a-f* included in the back-end systems to run in parallel because data is forwarded to the back-end applications 140*a-f* in parallel. The system 100 may include multiple forwarders 120*a-m* to increase robustness and scalability and to achieve load balancing. Also, rack sensor controllers assigned to a forwarder, as well as the back-end systems serviced by a forwarder, may be separately configured. In simple deployments, for example, when there is one back-end application, the rack sensor controller may deliver its messages directly eliminating the need for a forwarder.

The forwarders 120*a-m* may provide load-balancing and fail over. For example, each of the rack sensor controllers for the racks 110*a-n* may include a list of addresses to multiple forwarders and sends messages to one forwarder at a time in a consecutive manner. Alternatively, a forwarder may be selected randomly.

Regarding fail over, if one of the forwarders 120*a-m* fails, the rack sensor controllers for the racks 110*a-n* send messages to other functioning forwarders of the forwarders 120*a-m*. For example, the rack sensor controller 114 stores a list of forwarders 120*a-d*, which may include a list of addresses of the forwarders 120*a-d*. If transmission to the forwarder 120*a* fails, then the rack sensor controller 114 selects another one of the forwarders 120*b-d* for transmitting the message. Each of the forwarders 120*a-d* is capable of sending the messages to the one or more back-end applications the message is destined for.

The forwarders 120*a-m* are a central part of the dispatching network connecting a rack sensor controller to one or more of the back-end applications 140*a-f*. A forwarder, for example, receives SDC messages from rack sensor controllers assigned thereto and then replicates and relays them to a specified list of destinations, which may include one or more of the back-end applications 140*a-f*. The forwarders 120*a-m* may be software, hardware, or a combination of software and hardware. In one embodiment, the forwarders 120*a-m* include a common gateway interface (CGI) script written in a computer language, such as the C language, and works in conjunction with a web server. Web servers are typically designed to detect HTTP connections. The forwarders 120*a-m* may include CGI scripts running on a web server that detects HTTP connections for the rack sensor controllers of the racks 110*a-n*. This arrangement achieves high leverage and allows easy portability to virtually any HTTP server on any platform. Most web servers also support CGI scripting, making installation simple.

The forwarders 120*a-m* may be stateless and run each time the web server receives a message. For example, when a message is received, the HTTP web server invokes a forwarder specified in the message which immediately forks a sub-process for each destination URL, which may include URLs for the back-end applications 140*a-f*. Each sub-process relays, in parallel, the SDC message to its corresponding URL. In one embodiment, the forwarders 120*a-m* are implemented under Linux with the Apache web server on an x86 platform. In addition to Apache, the forwarders 120 *a-m* leverage an HTTP client library, LIBHTTP, to send SDC messages. For configuration, the forwarders 120*a-m* may use an existing small XML library to parse its XML configuration file. It will be apparent to one of ordinary skill in the art the forwarders 120*a-m* may be implemented using other known techniques. It will be apparent to one of ordinary skill in the art that this stateless operation of a forwarder is one technique for handling messages at the forwarder and other techniques may be used.

4. Adaptors

Each of the forwarders 120a-m may collect information from the rack sensor controllers of the racks 110a-n and dispatch the information to one or more of the back-end applications 120a-f via adaptors 130a-f corresponding to the back-end applications 120a-f. Each of the back-end applications 140a-f may use its own data format and procedures. The adaptors 130a-f convert messages from the forwarders 120a-m to a format compatible with a corresponding back-end application. For example, the adaptor 130a may convert a message from a rack sensor controller to a database command if the back-end application includes a database 140a for tracking the assets. In another example, the adaptor 130b converts messages to a format that is compatible with HP OpenView or other network monitoring software that may be used for tracking or monitoring the assets in a data center. In another example, the adaptor 130f converts messages to a format compatible with a visualization tool for viewing asset locations and histories.

5. Back-End Applications

The back-end applications 140a-f process information from the rack sensor controllers and make the information available to users, which may be performed in real-time. The back-end applications 140a-f may include but are not limited to databases, visualization tools and management tools, such as HP OpenView. The number and type of back-end applications may vary for each data center. To maximize operational ease of use and efficiency, asset location information may be integrated into an existing management application already deployed in the data center. In addition, a standalone, back-end, asset tracking application may be provided as one of the back-end applications 140a-f.

6. Configuration Server and Network Services

The network services 160 may include standard network services found on most intranets. The network services 160 may use Dynamic Host Control Protocol (DHCP) to auto-configure the TCP/IP stack of the rack sensor controllers of the racks 110a-n, which simplifies deployment. The network services 160 may use Network Time Protocol (NTP) to synchronize the time clock of the rack sensor controllers, so that messages have a proper timestamp, enabling accurate location history.

The configuration server 150 manages the configuration of the rack sensor controllers for the racks 110a-n from a central location to simplify management of the rack sensor controllers. The configuration server 150 may be connected to the rack sensor controllers of the racks 110a-n via a network for sending configuration information. For example, when the rack sensor controller 114 is booted up, it automatically fetches its configuration data from the configuration server 150. The configuration data may include which of the forwarders 120a-m the rack sensor controller 114 is to transmit messages. A list of addresses for forwarders may be sent to the rack sensor controller 114. The configuration data may include several other parameters that may be customized for each rack sensor controller. For example, the configuration data may specify the time intervals for conducting an inventory, whether RFID tags should be read when the rack door is opened or closed, threshold values for temperature sensors, and other specified parameters.

The configuration server 150 is also a monitoring tool for the rack sensor controllers and receives useful statistical information from the rack sensor controllers to determine whether the controllers are properly operating. Simple Network Management Protocol (SNMP) may be used to send configuration data. The configuration of all the rack sensor controllers may be easily updated at any time by the configuration server 150.

7. Tag Data and Message Types

According to an embodiment, RFID tags are mounted on assets, and the tags are read for tracking the assets. Data may be programmed into the RFID tags for tracking. For example, asset IDs for the assets 111a-x are stored in the RFID tags 112a-x. The IDs may include a customer key for each asset. The customer key comprises a unique ID provided by a user for each asset. In another example, the IDs include an asset serial number, a product number, and a manufacturer ID for each asset. The tag serial numbers provided by the tag manufacturers may also be used in IDs.

The RFID tags 112a-x are attached to the assets 111a-x. The location for attaching the RFID tags 112a-x on the assets 111a-x may be selected such that the RFID tags 112a-x may be read by the RFID reader array 113 when the assets 111a-x are in the slots of the rack 110n. The assets 111a-x may be arranged along a vertical axis of the rack 110n and a plurality of antennas or readers 117 in the RFID reader array 113 are mounted to the rack 110n and distributed in correspondence with the slots in the rack 110n. The RFID reader array 113 is operable to read the RFID tags 112a-x to determine at least one of a presence and a location of the assets 111 a-x. The location may include the slot for each asset as well as the location information stored in the rack controller 114 for the rack 110n.

The IDs for the assets 111a-x may be selected by an administrator and written into the RFID tags using a well known writer. In one example, the IDs are an ASCII string. Generous amounts of descriptive information can be included as many commonly available tags have capacities of 2 kilobits for less than 1 dollar per asset. One or more of the back-end applications 140a-f are responsible for tracking the assets and mapping the asset IDs to any logical identity needed by the end user, such as IP address, DNS name, model number of the asset, and the like.

Sensor information and location information is formatted into messages by the rack sensors controllers for the racks 110a-n and transmitted to the forwarders 120a-m for transmission to the back-end applications 140a-f. According to an embodiment, a communication protocol, called SDC, is used for transmitted data and formatted messages between the components in the system 100. It will be apparent to one of ordinary skill in the art that other protocols may alternatively be used.

The rack sensor controller 114 sends SDC messages including sensor and location information to one or more of the forwarders 120a-m, and by way of a forwarder, to various adaptors 130a-f. SDC is a simple message passing protocol that allows the decoupling of components, adding and removing components without restarting the system, and quick recovery from network or component failures. SDC messages are formatted in Extended Mark-up Language (XML) and sent via a POST mechanism of Hypertext Transport Protocol (HTTP). These Internet technologies enable efficient and safe operation on a wide variety of network configurations. The use of XML over HTTP also allows the adaptors 130a-f to use standard web tools to filter, inspect and process SDC messages.

According to an embodiment, messages transmitted from the rack sensor controllers, which are SDC messages in one embodiment, are divided into event, inventory and miscellaneous message categories.

Inventory messages are messages describing the state of assets in a particular area. Inventory messages may describe the complete state of a rack. For example, an inventory message includes a rack location, a position of a rack door, such as opened or closed, and, for each slot of the rack, an asset ID if an asset is detected in the slot or a null identity if the slot is empty. Inventory may be performed upon occurrence of an event. An event may include an event detected by a sensor or a lapse of a predetermined time interval for performing a periodic inventory.

Event messages may be generated in response to detection of a predetermined event and can indicate a change of status. The change of status may be associated with a change of status of one of the racks 110*a-n*. For example, the door for the rack 110*n* has been opened/closed or a server has been added/removed or temperature measurements exceed a threshold. These are events that may be detected by sensors or other means.

Miscellaneous messages are mostly error messages. However, miscellaneous messages may include other information as needed. Error messages may be associated with hardware failures or other failures.

FIG. 2 illustrates an embodiment of at least a portion of a message 200 that may be transmitted from a rack sensor controller, such as the rack sensor controller 114. The message may be transmitted to one or more of the forwarders 120*a-m* and to one or more of the adaptors 130*a-f* for the backend applications 140*a-f*. In this embodiment, the message is in XML format.

The message includes an XML header 201. A root or document element 202 includes an optional attribute, such as a version number. The content of the message includes one or more object elements. The object elements include one or more attributes and child elements. One attribute is an object ID 203. The object ID 203 is a string. An object element also includes a type, such as a rack or a tag. A child element is a location 204 including attributes describing the location. For example, the attributes include the main location, the space, the aisle and the rack number.

Other child elements include a time 205 and a capacity 206. The time 205 may include the time at which the object was created. This may include the time an event occurred or a time inventory was taken. Time stamping may be performed by the rack sensor controllers.

The capacity 206 may include the number of slots in a rack, which corresponds to the number of RFID antennas in the RFID reader array 113 when one antenna is provided per slot or the number of RFID readers when one reader is provided per slot.

Messages sent from the rack sensor controllers for the racks 110*a-n* may include the elements and attributes of the message shown in FIG. 2. FIGS. 3A-B illustrate examples of event messages including the elements of the message shown in FIG. 2.

FIG. 3A illustrates an example of a message 300 for a rack door event. A mode 303 is "event" because the message is generated in response to detecting a predetermined event. A data type 304 is "door" because the event is related to a state of a rack door. A door value 301 is provided for the event. The door value is the new state of the rack door, such as opened or closed. In this example, the door value 301 is "closed". A rack may include multiple doors and a door ID, such as the door ID 302, may be included for each door. When in the inventory mode, all the doors may be listed in the message. A door ID may be an integer staring with 0.

FIG. 3B illustrates a message 350 for an RFID event. A mode 313 is "event" because the message is generated in response to a new event. A data type 314 is "rfid" because the event is related to reading RFID tags on assets. The closing of a rack door may trigger a rack scan of the RFID tags on assets in the rack. This message lists the asset changes, such as added, removed or updated. For example, the asset changes for assets in slots 4 and 24 are "added" and "removed", shown as 320 and 321 respectively. The message may also include information read from the RFID tags, such as the "value" and "serial_number".

FIG. 4 illustrates an example of an inventory message 400. Inventory messages may be used to synchronize data for tracking assets stored at the back-end applications 140*a-f* shown in FIG. 1 with the current state of the racks 110*a-n*. For example, the rack sensor controller 114 performs an RFID scan when a rack inventory is performed. RFID scans may be performed and inventory messages may be sent periodically, when a new rack is provided, or at other times. The message 400 includes attribute values 401 for assets in slots 4 and 7. For example, inventory was performed for rack 110*n*. Rack 110*n* in this example only includes assets in slots 4 and 7. Information read from the tags for those assets is sent to the rack sensor controller 114 and the information is included in the attribute values 401 for the inventory message 400 transmitted, for example, to the forwarder 120*a*. The message 400 may not include event information, such as an event mode or an event comprising added, removed or updated, because the inventory may be performed periodically rather than in response to an event. In other examples, inventory may be performed in response to an event. Also, inventory messages may be generated for rack doors, temperature sensors, or for other sensors. For example, an inventory message for rack doors for a rack may list each door ID and its current state, such as opened, closed, no_sensor, or unknown. An inventory message for temperature sensors may list each sensor ID and current temperature measurements.

FIG. 5 illustrates an example of a miscellaneous message 500. Miscellaneous messages may be used for many different reasons. For example, miscellaneous message may be used to track failures of an RFID reader array or a rack sensor controller or to retrieve other information from the rack sensor controller. The message type of a miscellaneous message identifies a particular category of miscellaneous message. A message type 501 of the message 500 is "error". An error message 502 is "Could not initialize. Hardware is responding." The error message 502 may be a string. Miscellaneous messages may include other message types and other messages. Also, miscellaneous messages may be used to retrieve information about a rack. For example, the rack sensor controller 114 shown in FIG. 1 may receive a request for an IP address and MAC address of the rack 110*n* from the configuration server 150. The rack sensor controller 114 may send a miscellaneous message to the configuration server 150 including the IP and MAC addresses of the rack 110*n*.

8. Method Embodiment

Figure 6:
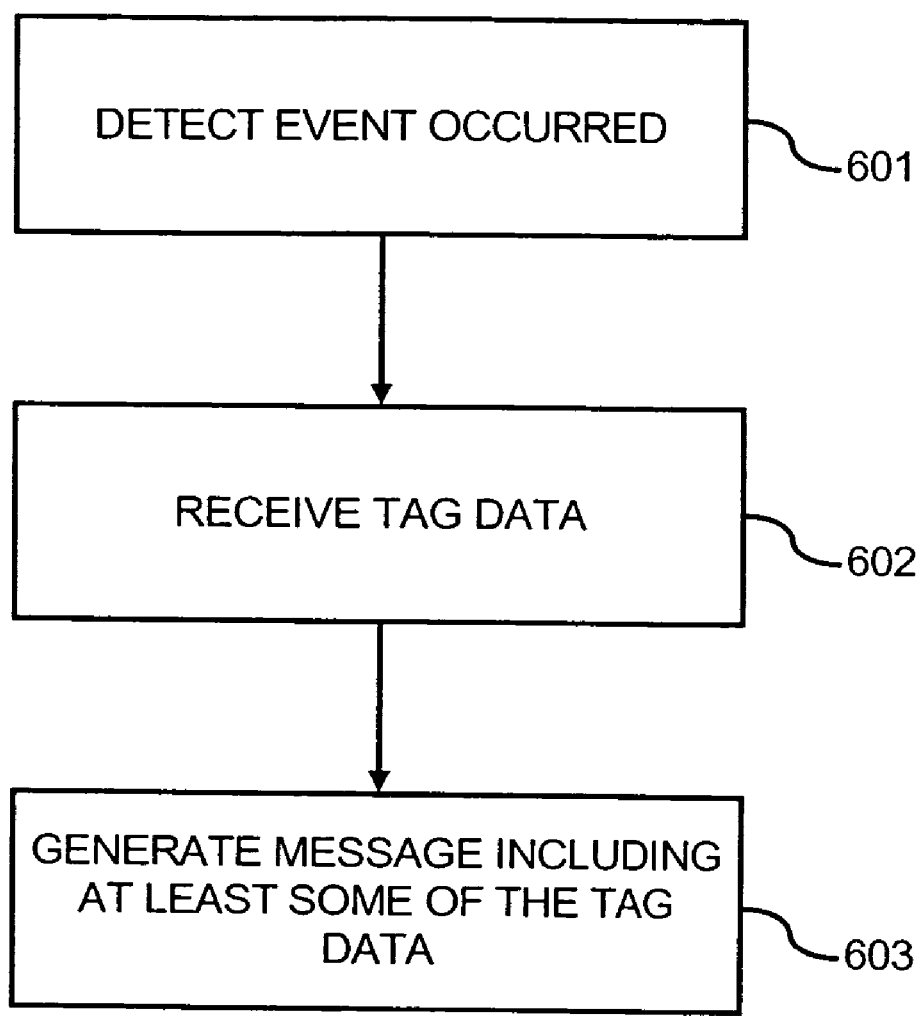
FIG. 6 shows a flow chart of method 600 for generating a message, according to an embodiment.

FIG. 6 shows a flow chart of method 600 for generating a message, according to an embodiment. The method 600 is described with respect to the system 100 and the rack sensor controller 114 by way of example and not limitation. The method 600 may be used with other asset tracking systems.

At step 601, the rack sensor controller 114 detects that an event occurred. One example of an event is whether a rack door has been opened or closed. Event detection may be based on the output of the sensors 115,116 and RFID reader array 113.

At step 602, the rack sensor controller 114 receives tag data from the RFID tags 112*a-x* for the assets 111*a-x* housed in the rack 110n. The tag data may be read by the RFID reader array 113. The assets 111a-x may be arranged vertically in the rack 110n and each asset may be provided in a slot in the rack 110n. The RFID reader array 113 may include an antenna adjacent each slot for reading an RFID tag of an asset in the slot if there is an asset in the slot.

At step 603, the rack sensor controller 114 generates a message for transmission to one or more of the back-end applications 140a-f. The message includes at least some of the tag data. For example, the message may be an event message that includes only changes in the state of the rack, such as any changes in the detected assets. In another example, the message is an inventory message including all the tag data.

9. Hardware Platform for Rack Sensor Controller and Other Components

Figure 7:
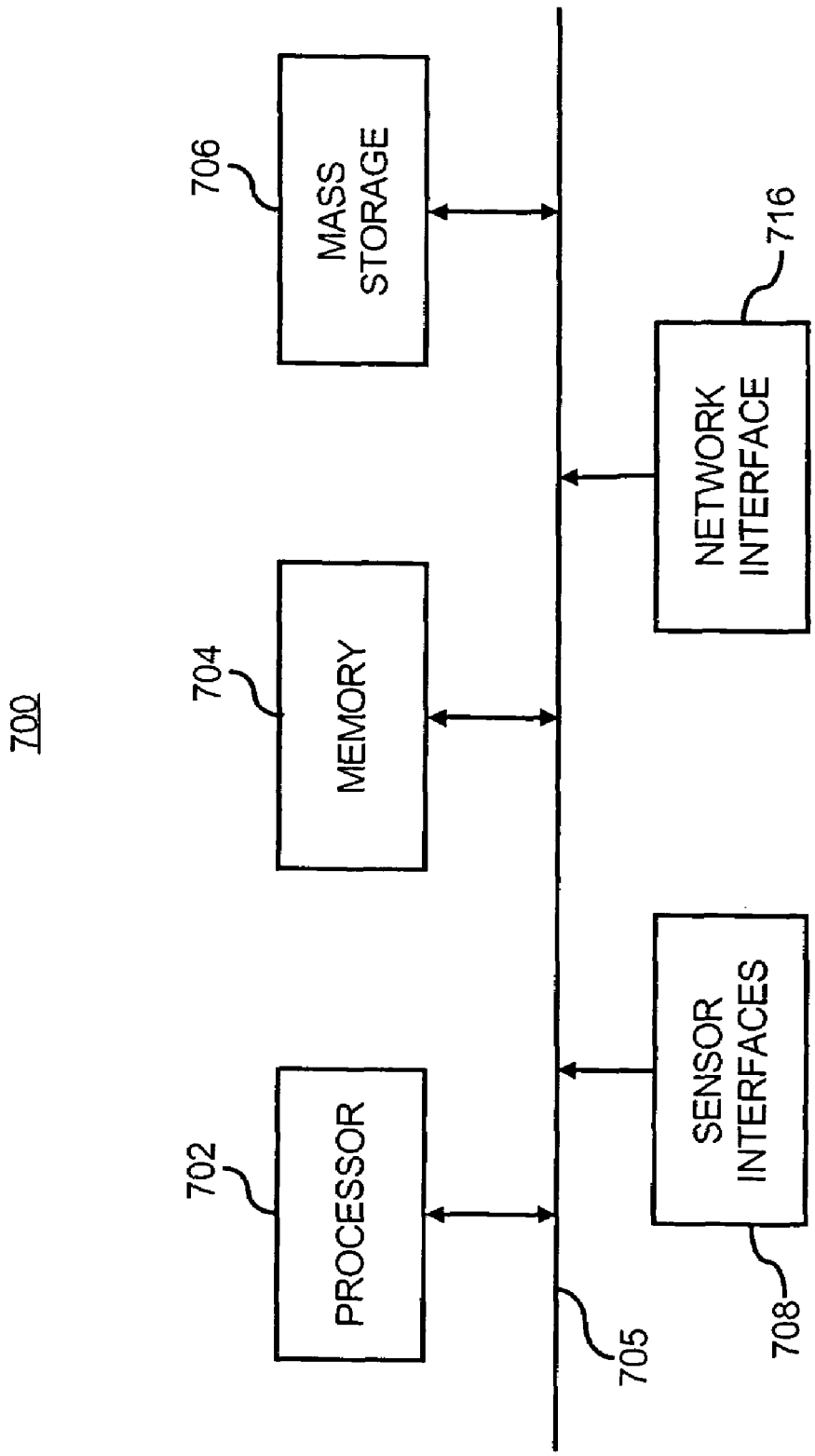
FIG. 7 shows a schematic diagram of a computer system in which one or more of the embodiments may be implemented.

FIG. 7 illustrates an exemplary block diagram of a computer system 700 that includes one or more processors, such as processor 702, providing an execution platform for executing software, for example, including at least some of the steps illustrated in the method 600 and other steps described herein. The processor 702 may also execute an operating system (not shown) for executing the software in addition to performing operating system tasks. The computer system 700 also includes a main memory 704, such as a Random Access Memory (RAM), where software may be resident during runtime, and mass storage 706. The mass storage 706 may include one or more hard drives and/or a removable storage drive, such as a floppy diskette drive, a magnetic tape drive, a compact disk drive, or a flash nonvolatile memory where a copy of software or data may be stored. Applications and resources may be stored in the mass storage 706 and transferred to the main memory 704 during run time. The mass storage 706 may also include ROM (read only memory), EPROM (erasable, programmable ROM), EEPROM (electrically erasable, programmable ROM). A bus 705 is shown for communicating data via components of the computer system 700.

A network interface 716 is provided for communicating with the forwarders 120a-m and other devices via a network. Also, sensor interfaces 708 are provided for connecting to the RFID reader array 113, the sensors 116 and the door position sensor 115 shown in FIG. 1. The computer system 700 is a simplified example of a platform. It will be apparent to one of ordinary skill in the art that the other components may be added or components may be removed as needed. For example, one or more interfaces may be provided for connecting one or more I/O devices.

One or more of the steps of the method 600 and other steps described herein and software described herein may be implemented as software embedded or stored on a computer readable medium, such as the main memory 704 or the mass storage 706, and executed by the processor 702. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

10. Rack Management

According to an embodiment, the system 100 shown in FIG. 1, in addition to allowing operators to track assets, is operable to provide an understanding of the physical context of assets in an infrastructure through policies. For example, the rack 110n is not scheduled for maintenance/repair and the door position sensor 115 detects that the door is opened. Based on local policy for the rack 110n, this could be labeled as an unexpected event. There are many possible reactions including logging the event, sending a warning or sounding an alarm which may be performed by the rack sensor controller 114. Polices, which may be customized for each rack, can be stored at the rack sensor controllers and used by the rack sensor controllers to monitor, automate and manage operations, including usage patterns, and to manage changes associated with the assets and racks.

What has been described and illustrated herein are embodiments of systems and methods along with some of their variations. The descriptions and figures used herein are set forth by way of illustration and are not meant as limitations. Those skilled in the art will recognize that many variations are possible within the scope of these embodiments and the scope of the following claims and their equivalents.

What is claimed is:

1. A rack sensor controller for tracking assets comprising:
a memory storing a location of the rack and sensor information received from a plurality of sensors, wherein at least some of the sensors include one or more RFID readers operable to read RFID tags attached to assets housed in a rack;
a processor operable to receive the sensor information and generate a message including the sensor information and the location of the rack for transmission to one or more back-end applications via a first forwarder, wherein the one or more back-end applications use the location of the rack and the sensor information to track the assets,
and the first forwarder is operable to receive the message, determine the one or more back-end applications to receive the message, if the one or more backend applications include multiple back-end applications determined to receive the message, replicate the message for each of the multiple back-end applications, and transmit the message to the one or more back-end applications.

2. The controller of claim 1, wherein the memory also stores a list of forwarders and if transmission via the first forwarder fails, the processor is operable to select a second forwarder from the list for transmitting the message to the one or more back-end applications via the second forwarder.

3. The controller of claim 2, wherein the controller selects the first forwarder randomly or consecutively from the list of forwarders for balancing a load on each forwarder, wherein the load on each forwarder is based on messages received from a plurality of rack sensor controllers.

4. The controller of claim 1, wherein each backend application includes an adaptor converting the message received from the rack sensor controller via the forwarder to a format used by the back-end application.

5. The controller of claim 2, wherein the backend applications comprise one or more of a database, an asset tracking and visualization tool, and a monitoring tool.

6. A rack sensor controller comprising:
a memory storing a location of a rack and sensor information received from a plurality of sensors, wherein at least some of the sensors include one or more RFID readers operable to read RFID tags attached to assets housed in the rack;
a processor operable to receive the sensor information and generate a state message for tracking the assets in response to detecting a change in state of one or more of the assets housed in the rack, and
the same processor is further operable to generate a stateless message for tracking the assets, wherein the stateless message is generated regardless of the change in state of one or more of the assets housed in the rack,
wherein the state message and the stateless message at least include some of the sensor information and location information.

7. The controller of claim 6, wherein the change in state comprises the opening or closing of a door for the rack.

8. The controller of claim 6, wherein the change in state is detected from the sensor information.

9. The controller of claim 6, wherein the state message identifies a change in state of the one or more of the assets housed in the rack instead of a current state of all the assets housed in the rack and the stateless message includes the current state of all the assets housed in the rack.

10. The controller of claim 6, wherein the message includes information comprising:
a time associated with the sensor information;
the location or identity of the rack;
a capacity of the rack;
a mode identifying whether the message is a state message or a stateless message;
a data type describing the sensor information or a text string provided in the message; and
the sensor information or the text string.

11. The controller of claim 10, wherein the information is provided in an XML schema.

12. The controller of claim 6, wherein the sensor information comprises tag data read from the RFID tags, the tag data including at least one of a customer key for each asset and an asset serial number for each asset.

13. The rack sensor controller of claim 6, wherein the rack sensor controller receives sensor information from a door position sensor operable to detect whether a door for the rack has been opened or closed, and
the processor is operable to detect whether the door has been opened or closed from the sensor information from the door position sensor and, in response to the door being opened or closed, to generate a message including at least some of the sensor information comprising tag data read from at least some of the RFID tags, the location of the rack, and locations of the assets in the rack for the assets associated with the tag data read from the at least some of the RFID tags.

14. The rack sensor controller of claim 6, wherein the rack sensor controller is operable to generate a message including the sensor information and the location of the rack for transmission to one or more back-end applications via a first forwarder, wherein the one or more back-end applications use the location of the rack and the sensor information to track the assets.

15. The rack sensor controller of claim 14, wherein the processor is operable to transmit the message to a second forwarder in response if the first forwarder fails, and the second forwarder is operable to transmit the message to the one or more back-end applications.

16. The rack sensor controller of claim 6, wherein the rack sensor controller is provided in a system including a plurality of racks with respective rack sensor controllers, and the rack sensor controller is operable to receive configuration messages from a configuration server, the configuration messages including customized parameters for the rack sensor controller that are different than parameters for other rack sensor controllers.

17. A method comprising:
determining whether an event occurred that is associated with a rack housing a plurality of electronic devices, the rack including a plurality of slots, the plurality of slots receive the plurality of electronic devices such that the plurality of electronic devices are arranged along a vertical axis in the slots; and
receiving tag data read from RFID tags using at least one reader connected to a plurality of RFID antennas located adjacent the plurality of slots to receive the tag data from the RFID tags;
from a rack sensor controller at the rack, generating a state message for tracking the electronic devices in response to detecting a change in state of one or more of the electronic devices housed in the rack, and
from the rack sensor controller, generating a stateless message for tracking the electronic devices, wherein the stateless message is generated regardless of the change in state of one or more of the electronic devices housed in the rack, wherein the state message and the stateless message at least include some of the tag data and location information for the rack.

18. The method of claim 17, wherein determining whether an event occurred further comprises:
determining whether a door for the rack has been opened or closed or determining when a temperature exceeds a threshold.

19. The method of claim 17, wherein the state message includes new states of the one or more electronic devices determined to have the changed state.

20. The method of claim 17, wherein the stateless message includes a current state of all the electronic devices housed in the rack.

21. The rack sensor controller of claim 6, wherein the processor is further configured to send the state and stateless messages to a forward operable to identify one or more back-end applications to receive each of the messages, and if the one or more backend applications include multiple back-end applications, replicate the message for transmission to each of the one or more multiple back-end applications.

* * * * *

UNITED STATES PATENT AND TRADEMARK OFFICE
CERTIFICATE OF CORRECTION

PATENT NO. : 7,436,303 B2  Page 1 of 1
APPLICATION NO. : 11/389784
DATED : October 14, 2008
INVENTOR(S) : Jean Tourrilhes et al.

It is certified that error appears in the above-identified patent and that said Letters Patent is hereby corrected as shown below:

In column 8, line 16, delete "11la-x" and insert -- 111a-x --, therefor.

In column 14, line 56, in Claim 21, delete "forward" and insert -- forwarder --, therefor.

Signed and Sealed this

Fourth Day of August, 2009

JOHN DOLL
*Acting Director of the United States Patent and Trademark Office*